J. H. SHARP.
CORN SHELLER.
No. 77,410.  Patented Apr. 28, 1868.
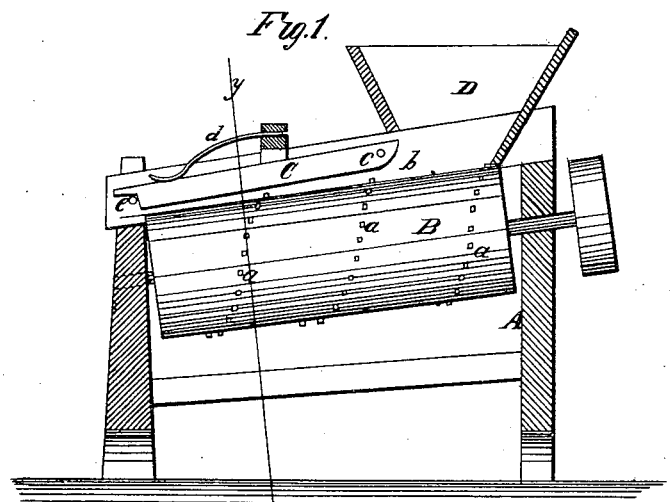
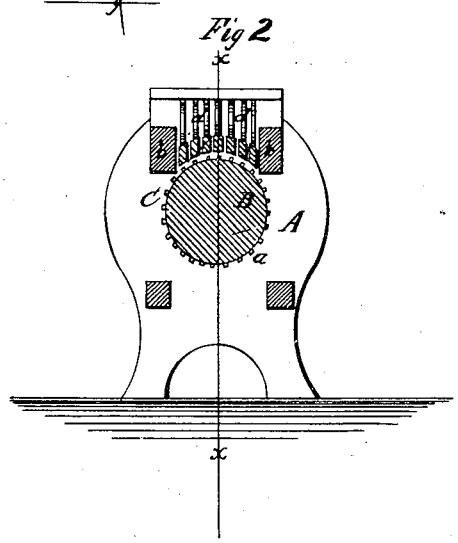
Witnesses.
Theo Fische
J. A. Service
Inventor.
John H Sharp
Per Munn Co
Attorneys

United States Patent Office.

JOHN H. SHARP, OF WORTSVILLE, NEW JERSEY.

Letters Patent No. 77,410, dated April 28, 1868.

---

IMPROVEMENT IN CORN-SHELLERS.

---

*The Schedule referred to in these Letters Patent and making part of the same.*

---

TO ALL WHOM IT MAY CONCERN:

Be it known that I, JOHN H. SHARP, of Wortsville, in the county of Hunterdon, and State of New Jersey, have invented a new and improved Corn-Sheller, and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

This invention relates to a new and improved corn-sheller, of that class which are designed for operation on a large scale, and it consists of a revolving spirally-toothed cylinder, in connection with a concave composed of a series of yielding bars, all arranged to operate as hereinafter fully shown and described. In the accompanying sheet of drawings—

Figure 1 is a vertical longitudinal section of my invention, taken in the line $x$ $x$, fig. 2.

Figure 2, a transverse section of the same, taken in the line $y$ $y$, fig. 1.

Similar letters of reference indicate like parts.

A represents a frame, which may be constructed in any proper manner to insure strength and durability, and B is a cylinder, placed in the upper part of said frame, and provided with a spiral row of steel or hard-metal teeth, $a$. This cylinder has its axis slightly inclined from a horizontal plane, and it may be constructed of wood, covered with sheet metal, in order to avoid abrasion and wear.

Between the two upper side-pieces $b$ $b$ of the frame A, there is placed, side by side, a series of bars, C, which work on a rod, $c$, passing transversely through the side-pieces $b$ $b$ and the rear ends of the bars, the latter having each a spring, $d$, bearing on them, the springs having a tendency to keep the outer ends of the bars down upon a rod, $e$, which passes transversely through the side-pieces, (see fig. 1.)

The bars C are made concave at their under sides, to conform to the curvature of the cylinder B, as shown clearly in fig. 2, and these bars, it will be understood, form a concave for the cylinder, are directly over it, and nearly parallel with its axis, the inner ends being slightly more elevated above the cylinder than the lower or outer ends, as will be fully understood by referring to fig. 1.

D is a hopper, placed on the frame A, at the inner ends of the bars C, and into this hopper the corn to be shelled is placed. The cylinder B is rotated by any convenient power, and the ears of corn pass down between the top of the cylinder B and the bars C, the teeth $a$ of the cylinder rotating the ears, stripping the grains or kernels of corn therefrom, and at the same time feeding them along to the outer ends of the bars C, between which and the lower end of the cylinder the cobs are discharged, the corn being all shelled from the cobs by the time the latter reach the lower or outer ends of the bars.

The corn, as it is shelled from the cobs, passes out underneath the side-pieces $b$ $b$ and the top of cylinder B, but there is not sufficient space for the cobs to pass out at these places, and they are consequently discharged at the point specified.

By having the concave composed of a series of bars, C, with springs $d$ bearing upon them, the concave is made to conform to the varying size of the ears of corn, and such a degree of flexibility allowed it that all the ears of corn, large, small, and medium size, will have all the grains or kernels shelled from them.

Having thus described my invention, I claim as new, and desire to secure by Letters Patent—

The employment of a series of yielding bars C C, suspended over the inclined roller B by means of springs $d$ $d$ and rod $e$, when all are arranged as and for the purpose described.

JOHN H. SHARP.

Witnesses:
J. S. MANNERS,
WM. T. HIXON.